United States Patent [19]

Hoxey

[11] Patent Number: 5,339,420
[45] Date of Patent: Aug. 16, 1994

[54] PARTITIONING CASE STATEMENTS FOR OPTIMAL EXECUTION PERFORMANCE

[75] Inventor: Steven M. Hoxey, Claremont, Canada

[73] Assignee: International Business Machines Corporation, Armonk, N.Y.

[21] Appl. No.: 649,093

[22] Filed: Feb. 1, 1991

[30] Foreign Application Priority Data

Feb. 14, 1990 [CA] Canada ................ 2010068

[51] Int. Cl.$^5$ .................................. G06F 9/45
[52] U.S. Cl. ...................... 395/700; 364/DIG. 1; 364/280; 364/280.4; 364/280.5
[58] Field of Search ........................ 395/700

[56] References Cited

U.S. PATENT DOCUMENTS 5,093,916 3/1992 Karp et al. ..................... 395/700

*Primary Examiner*—Paul V. Kulik
*Attorney, Agent, or Firm*—Wayne P. Bailey; Diana L. Roberts

[57] ABSTRACT

This invention permits an optimizing compiler to select optimal instruction sequences for handling the source level multi-way branch, commonly known as the case or switch statement. A costing heuristic is established, based on machine specific information, which weights the relative performance of instruction sequences used to perform statement selection from several available selection methods. The constants, which form the basis of the selection criteria, are then clustered into sets. This clustering is controlled by the costing heuristic. The resulting sets represent clusters of values for which a particular selection method is most appropriate. The invention is preferably implemented at the intermediate code level, and with appropriate preselection of parameters by the compiler builder, allows the invention to be used on any type of target machine. The use of the invention results in faster compilation and execution.

8 Claims, 1 Drawing Sheet

PARTITIONING CASE STATEMENTS FOR OPTIMAL EXECUTION PERFORMANCE

FIELD OF THE INVENTION

This invention relates to optimizing compilers. More particularly, it relates to the improvement in execution performance of multi-way branches by using a function indicative of the cost of each possible solution method for the multi-way branch, comparing the relative costs of each method prior to executing the multi-way branch, and selecting for execution the lowest-cost method.

BACKGROUND OF THE INVENTION

Most high level languages contain a language construct that is typically viewed as a multi-way branch, in which a runtime variable is compared with each of the members of a set of constants, and a statement selection is made based on the result of the comparisons. Such constructs are sometimes known as case or switch statements. The runtime variable, also known as the "case selector", which can be an expression, is tested against a set of specified constants, also known as "case items". As is well-known in the art, multi-way branches utilize various selection methods in order to perform the required logic, including range tests, jump tables, compare-and-branch sequences, address translation and arithmetic progression. The method which yields the best performance in execution varies greatly with the underlying architecture of the machine on which the compiled program is executed, and also with the distribution of the values in the selection set, that is, the set of constants against which the runtime variable is to be compared.

Known attempts to overcome the problem of producing the best performing code, have generally related to the particular machine architecture for which the program is being compiled, that is, the target machine. This has been done by including in the solving method, and in the heuristic information, assumptions about the code formats which are optimal for that machine. For example, since multi-way branching is a commonly used construct in high level languages, architects of some Complex Instruction Set Computer (CISC) Systems have built instructions into such computers which provide table indexed branching at relatively little cost. Implementers of multi-way branching logic for such architectures frequently tailor their solution method so as to always make use of this instruction, even though for some collections of data it is not the best performer. The known prior art methods produce code that is optimal for only one machine, and under one set of conditions of the selection set that is to be compared with the runtime variable.

R. Bernstein, "Producing Good Code for the Case Statement," IBM RESEARCH REPORT 10525, (#45755) Dec. 6, 1983, describes some considerations to be used in determining which test for a case statement is appropriate, where available tests include jump table, range test, binary search and linear search, and discloses a method of selection starting with all the case items as a single cluster, sometimes called a "set", and breaking into smaller and smaller clusters until each meets the minimum case-density requirements for a jump table solution. Then the several types of tests are performed in a predesignated sequence, always beginning with a jump table.

A very general discussion of optimization methods is given in Chapter 10 of Aho, Sethi and Ullman, COMPILERS: PRINCIPLES, TECHNIQUES AND TOOLS, Addison-Wesley (1988). Other relevant prior art references are L. Atkinson, "Optimizing Two-state Case Statements in Pascal", SOFTWARE—PRACTICE AND EXPERIENCE, 12:6 (1982), 571–581; and J. Hennessey and N. Mendelsohn, "Compilation of the Pascal Case Statement", SOFTWARE—PRACTICE AND EXPERIENCE, 12:9 (1982), 879–882.

Despite these attempts, there remains a need for an optimizing method for evaluating case statements at minimum cost of execution which not only handles all numbers and densities of case items likely to be encountered in compilation, but also is portable, i.e., which can be used on target machines having differing architectures.

SUMMARY OF THE INVENTION

It has now been found that the handling of multi-way branch statements can be facilitated by predefining the possible branches that could be taken according to specific values of the runtime variable, costing each of the methods according to a predefined costing method, and selecting the lowest-cost solution for execution.

Accordingly, the invention provides a method of optimizing a program to be compiled in a computer, the method comprising the steps of:
(a) selecting a multi-way branch statement;
(b) determining the relative execution costs of each of a plurality of instruction sequences to implement the multi-way branch statement;
(c) selecting an instruction sequence from the plurality of instruction sequences that carries the least cost; and
(d) implementing the least-cost instruction sequence.

The invention further provides a method of optimizing a program to be compiled in a computer, comprising the steps of:
(a) selecting a multi-way branch statement;
(b) determining the relative costs of each method of performing a test to select which branch is to be taken by the program, where the methods comprise jump table, range test, compare-and-branch, arithmetic progression and address translation;
(c) selecting the method that entails the least cost; and
(d) implementing an instruction sequence corresponding to the selected method.

The invention further provides an improved compiler for optimizing a program to be executed in a computer, said compiler comprising:
(a) means for selecting a multi-way branch statement;
(b) means for determining the relative costs of each method of performing a test to determine which branch is to be taken by the program, where the methods comprise jump table, range test, compare-and-branch, arithmetic progression and address translation;
(c) means for selecting the least-cost method; and
(d) means for implementing an instruction sequence corresponding to the selected method.

The method and compiler of the invention deal with case statements by dealing with the possible values of the test variable as set elements during the compilation of the code, by identifying sets combining the test points, in which range sets contain all of the possible points within a range defined by the combined points; dense sets contain a proportion of valid points which is at least a certain value selectable by the programmer, that is dependent upon, among other things, the target machine; unique sets contain only one point each, which have not been combined into range or dense sets; and a bound set contains the points left over after all other sets are selected.

Other approaches have attempted to solve this problem for a particular target machine, hence the heuristic information, and some underlying assumptions about what kind of code is optimal, becomes part of the solving procedure. The present invention needed to address multiple architectures simultaneously and remove the assumptions which might be good for machine A but not for machine B.

R. Bernstein's discussion of the "greedy approach" to interval clustering suggests that his initial set contains all of the selection values. After each split, new gaps between sub-intervals are calculated, the maximum of which becomes the position of the next split. The underlying assumption, not specifically stated, is that a jump table method is the best method to look for. This invention takes the opposite approach, namely to merge small intervals rather than split large intervals. This should result in a reduction in the amount of computations necessary to partition the data and, as stated above, the ability to select which method is optimal for a particular target architecture.

DETAILED DESCRIPTION OF THE PREFERRED EMBODIMENT

Figure 1:
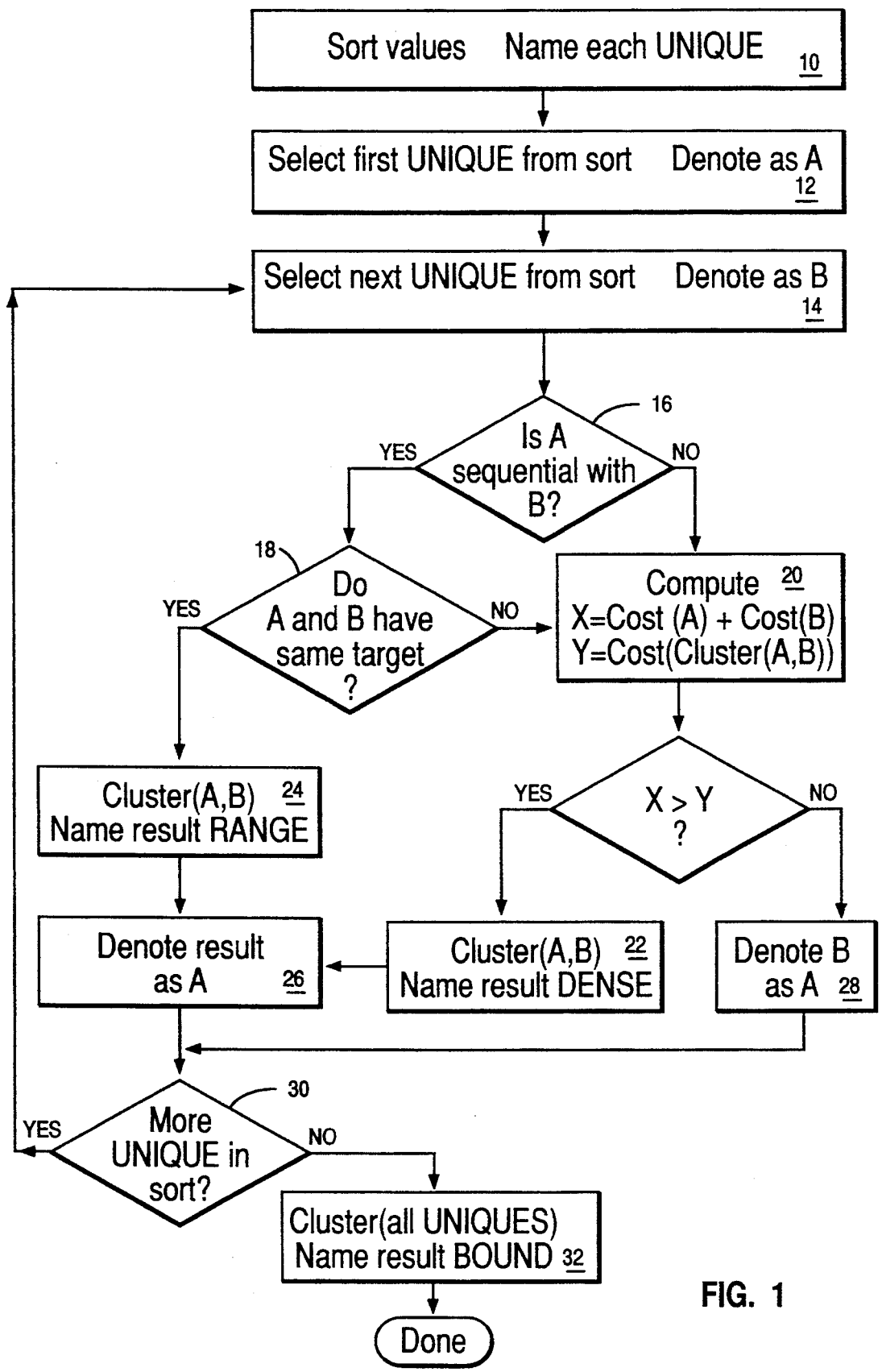
FIG. 1 is a flow chart for choosing the lowest cost method of execution.

The present invention is directed to lowering execution costs of a compiled program on any target machine by reducing the number of clock cycles taken in evaluating multi-way branch statements. Clock cycles is a frequently-used measurement for the time a central processing unit takes to perform a particular operation or function. The method of the invention also has the general effect of lowering the amount of memory utilized by such evaluations. It is designed to be applied to any type of target machine architecture with which its associated compiler is used. As will be described below, since the optimizing method of the invention is generally applied at the intermediate code level, it is readily adaptable to various target computer architectures in part because the "back end", translates the optimized intermediate code into machine code which is actually executed by the target computer. The principle of optimization is well known in the art of compiler writing, and need not be further discussed herein.

Costs associated with the selection of the proper branch to follow include both costs associated with compiling and costs associated with the actual processing of the compiled program on the target machine, that is, execution costs. Since compilers generally are run only once for each program, to put it into executable form, and the compiled program is executed many times, costs associated with compilation are small compared with execution costs, and compilers have become more sophisticated in order to optimize the execution of the compiled program, even at some cost in compiler size and compile time.

Multi-way branch statements are located anywhere in the code in most typical source programs. Each such statement is a candidate for the minimum-cost method described herein. The appropriate branch to follow is selected by the program depending upon many factors, including parameters included in the source text of the program, and what data have been input to the system in conjunction with the program. As noted above, there are several methods by which the variables of the multi-way branch statement can be tested to select the correct branch. These methods include generating a jump table, performing a range test, compare-and-branch sequences including linear searching and binary searching, address translation and recognition of arithmetic progressions. Not all of these methods are necessarily used on each computer architecture, and the way in which they are implemented differs from one architecture to another. Each of these methods carries a cost that depends upon, among other things, the value of the data in the particular runtime variables at the time the branch is being evaluated, the number of choices from which the branch can select, in order to transfer control, and the target machine. Different types of operations have relative costs that differ, depending upon what instructions are available in the architecture of the machine and how each instruction operates. These are well-known to the person skilled in the art of programming the particular machine.

The cost parameters for evaluating a given branch can be inserted into a costing heuristic, which enables the compiler to evaluate the cost of execution of the evaluation.

In a preferred embodiment of the invention, designed for commercial implementation, the choice of case selection methods was limited to range analysis, jump table generation, and two forms of compare-and-branch sequences: linear and binary searching. These are the selection methods most commonly used in evaluating multi-way branches. Because the particular computer system used in the embodiment had no instruction for address translation, it was unnecessary to incorporate that as a case selection method.

In the description of the preferred embodiment below, the names given to various sets, sometimes called "clusters", for convenience and clarity have been chosen generally to reflect the selection method used for the members of the respective sets.

RANGE is a set of sequential values whose target location is the same statement.

An example of a preferred implementation of the C function isdigit(c) is shown below:

| Using C | Using PASCAL |
| --- | --- |
| switch(c) { | CASE c OF |
| case '0': | '0' ... '9': x: = 1; |
| case '1': | OTHERWISE: x: = 0; |
| case '2': | END |
| case '3': | |
| case '4': | |
| case '5': | |
| case '6': | |
| case '7': | |
| case '8': | |
| case '9': return(1); | |
| } | |
| return(0); | |

A way well-known in the art to deal with a RANGE set is to perform a simple range test using the four-instruction sequence:
1. compare the runtime variable against the high bound of the range;
2. branch if the variable is greater than;
3. compare the runtime variable against the low bound;
4. branch if the runtime variable is not less than, to target location.

An equivalent shorter sequence for a machine architecture which allows unsigned or "logical" comparisons is:
1. subtract low bound of the range from the runtime variable;
2. logical compare result against the difference between the high bound and the low bound;
3. branch if not logically greater than, to target location.

DENSE is a set of values, not necessarily sequential, which have different target locations, whose set density, sometimes called the "case density", which is the number of distinct values divided by the difference between the maximum and minimum values in the set, is within limits supplied to the costing heuristic. The limits can be supplied by the programmer, or preselected to cover the most frequently-encountered situations. For example, if from the set of integers in the range 10 to 49 inclusive, a dense set is envisaged which selects the odd integers from that range as available values, then the case density of that set would be 0.5. An example using a dense set for each of two languages is shown below:

| using C | using PASCAL |
|---|---|
| switch(c) { | CASE c OF |
| case 'A': x = 0; break; | 'A': |
| x: = 0; | |
| case 'B': x = 1; break; | 'B': |
| x: = 1; | |
| case 'D': x = 2; break; | 'D': |
| x: = 2; | |
| } | END |

A well-known method of dealing with the DENSE set is the way most non-optimizing compiler implementations deal with multi-way branching as a matter of course, that is, generating a jump table which is referenced via an indexed load instruction, and branching to the address loaded. This sequence is normally preceded by the three or four instruction range test sequence, as described above, to guard against addressing exceptions. The entire sequence is therefore:
1. range test code which falls through on success;
2. load address from table; and
3. branch to address loaded.

BOUND is a set containing the union of all the remaining selection values which do not get clustered into one of the other two classes. The BOUND set will be dealt with as a sequence of instruction pairs, each pair including a compare and a branch-on-equal.

UNIQUE is a set with only one member. Each member of the universe of selection values is initially represented in this manner before the partitioning is done.

The clustering method of FIG. 1 is to examine the sets in sorted order attempting to unite each set with its nearest neighbors at 10, 12 and 14. The union (which is a subfunction of Cluster) is performed if the costing heuristic 20 determines that the resulting set has a more cost-effective implementation than the sum of the individual implementation costs. Using this approach each UNIQUE set need only be examined once to form DENSE 22 or RANGE 24 sets; these sets continue to grow at 26 and 28 until all UNIQUE sets are examined at 30. The union of all UNIQUE sets not clustered into DENSE or RANGE sets becomes the BOUND set. This completes the partitioning step.

Once partitioned, the selection code can now be generated for the data within each set. Each set is then examined in turn to generate the appropriate selection logic for its members. The current generation logic assumes that each value from the initial universe has equal probability of occurring at run time, and therefore generates the tests in a linear fashion. If, however, there is a sufficient number of sets, or members in the BOUND set, then each set is arranged as a node in a binary tree which is traversed at runtime. The decision to switch from linear to binary search logic is once again determined by the costing heuristic, noting that the binary search method would require an additional compare and branch at each node of the tree.

With additional facilities to provide probability information about which values are most likely, one could also consider using a Huffman search at this point. The methodology of a Huffman search is well known to the person skilled in the art.

An examination of the code patterns for the various methods reveals that a machine-specific costing heuristic is developed from the following instruction costs:
1. Compare (both unsigned and signed if appropriate)
2. Conditional Branch
3. Subtract constant from register
4. Load register from memory
5. Branch to address in register
6. Load and branch to address (some architectures have jump table accessing built in)
7. Memory cost, can be used to reflect varying instruction lengths independent of cycle times. If optimizing for space, the use of jump tables may also incur additional overhead which will effect clustering.
8. Density limit, reflects the memory overhead one is willing to allow in the production of a jump table which is partially unused independent from the memory cost to maintain it.

The following example illustrates an improvement in execution speed that could be obtained on a typical Reduced Instruction Set Computer (RISC) system, through implementing the method of the invention:

| Using C |
|---|
| switch(c) { |
| case 1: |
| case 2: |
| case 3: |
| case 4: |
| case 5: |
| case 6: |
| case 7: |
| case 8: |
| case 9: return(1); |
| } |
| return(0); |

The straightforward approach to this code fragment might be to generate a sequence of compare-and-branch instructions. In this case there would be nine compare instructions and nine branch instructions each representative of a particular "case n:" clause. On the IBM[1] RT[2] PC system, for example, each instruction takes one cycle to execute; the cost of performing the selection can be as high as eighteen cycles. If, however, this code were implemented as a range test it would require only four cycles. This represents a saving of fourteen out of eighteen cycles on that particular computer system, or 78 percent.

[1]Trademark of International Business Machines Corp.
[2]Trademark of International Business Machines Corp.

Time savings differ for various processors and various sizes and densities of case statements, as would be readily understood by the person skilled in the art; however, on average a substantial saving in processing time can be realized on processors of all types commonly used in the data processing field.

The embodiments of the invention in which an exclusive property or privilege is claimed are defined as follows:

1. A method for optimizing the compiling of a program having multi-way branch statements, said method comprising the steps of:
   (a) selecting a multi-way branch statement from said multi-way branch statements;
   (b) examining said selected multi-way branch statement to determine the relative costs for each of a plurality of instruction sequences to implement said multi-way branch statement;
   (c) comparing the relative cost for executing each of said plurality of instruction sequences:
   (d) selecting one of said instruction sequences from said plurality of instruction sequences that carries the least cost;
   (e) implementing said selected least-cost instruction sequence in the compiled version of said program; and
   (f) repeating said steps (a) through (e) for each of said multi-way branch statements in said program.

2. A method as claimed in claim 1, in which said plurality of instruction sequences comprises range test, jump table, compare-and-branch, arithmetic progression and address translation.

3. A method as claimed in claim 1 wherein said costs include code of machine time required to execute said program.

4. A method as claimed in claim 1, further comprising setting a plurality of selection values according to parameters determined by a source text of said program to be compiled.

5. A method as claimed in claim 1, in which said step of comparing the relative cost is made by inserting values in a costing heuristic, and further comprising setting said values in said costing heuristic according to the architecture of said computer.

6. A method as claimed in claim 1 further comprising the steps of:
   establishing a costing heuristic; and
   clustering constants into sets from which said costing heuristic selects said lowest-cost instruction sequence.

7. An improved compiler for optimizing a program to be executed by a computer, said compiler comprising:
   (a) means for selecting a multi-way branch statement;
   (b) means for examining said multi-way branch statement to determine and compare the relative costs of executing each of a plurality of selection methods to determine which branch is to be taken by said program, where said plurality of selection methods comprise a jump table, range test, compare-and-branch, arithmetic progression and address translation;
   (c) means for selecting the least-cost selection method; and
   (d) means for implementing an instruction sequence corresponding to said selected least-cost selection method in the compiled version of said program.

8. An improved compiler as claimed in claim 7, in which said costs include cost of machine time required to execute said program.

* * * * *